(12) United States Patent
Steppat

(10) Patent No.: US 6,588,190 B2
(45) Date of Patent: Jul. 8, 2003

(54) SHIELD FIXED OVER CROP CONVEYOR WHEEL OF MACHINE FOR MOWING STALK-LIKE CROPS

(75) Inventor: Manfred Steppat, Stadtlohn (DE)

(73) Assignee: Maschinenfabrik Kemper GmbH & Co. KG, Stadtolhn (DE)

( * ) Notice: Subject to any disclaimer, the term of this patent is extended or adjusted under 35 U.S.C. 154(b) by 0 days.

(21) Appl. No.: 10/078,291

(22) Filed: Feb. 19, 2002

(65) Prior Publication Data

US 2002/0116911 A1 Aug. 29, 2002

(30) Foreign Application Priority Data

Feb. 22, 2001 (DE) .......................... 101 08 505

(51) Int. Cl.$^7$ .......................... A01D 45/02; A01D 75/00
(52) U.S. Cl. .................. 56/119; 56/6; 56/94; 56/255
(58) Field of Search ................. 56/51, 94, 96, 56/99, 100, 101, 102, 119, 121.4, 244, 255, 295, 291, 6, 53

(56) References Cited

U.S. PATENT DOCUMENTS

| | | | | |
|---|---|---|---|---|
| 4,594,842 A | * | 6/1986 | Wolters et al. | 56/94 |
| 4,926,623 A | * | 5/1990 | Fiener | 56/60 |
| 5,404,695 A | * | 4/1995 | Gemelli | 56/6 |
| 5,408,814 A | * | 4/1995 | Milbourn | 56/15.2 |
| 5,546,737 A | | 8/1996 | Moosbrucker | 56/94 |
| 5,651,243 A | * | 7/1997 | Arnold et al. | 56/94 |
| 5,704,201 A | * | 1/1998 | Van Vleet | 56/14.9 |
| 5,722,225 A | * | 3/1998 | Wuebbels et al. | 56/60 |
| 5,852,922 A | | 12/1998 | Over Behrens et al. | 56/14.7 |
| 6,374,587 B1 | * | 4/2002 | Wubbels et al. | 56/103 |
| 6,430,907 B2 | * | 8/2002 | Wolters et al. | 56/64 |

FOREIGN PATENT DOCUMENTS

| | | | |
|---|---|---|---|
| EP | 0253125 A2 | * | 6/1987 |
| EP | 0 673 594 | | 9/1995 |
| EP | 0 760 200 | | 3/1997 |
| GB | 2 012 154 A | | 7/1979 |

* cited by examiner

Primary Examiner—Robert E. Pezzuto
Assistant Examiner—Nathan Mammer

(57) ABSTRACT

A machine for mowing stalk-type crops includes a crop conveyor wheel mounted for rotation about an approximately vertical axis and provided with recesses that are distributed over its circumference and designed as receptacles for plant stalks. A stationary shield is fixed directly above the conveyor wheel and includes an outer region located above an outer portion of the conveyor wheel just inwardly of the recesses of the surface of the conveyor wheel. In order to improve the crop transport and to prevent the loss of corn cobs, the shield is provided with an arcuate cutout located between the outer region and an inner region of the shield, the cutout having an open end located adjacent to the crop flow received by the machine.

6 Claims, 1 Drawing Sheet

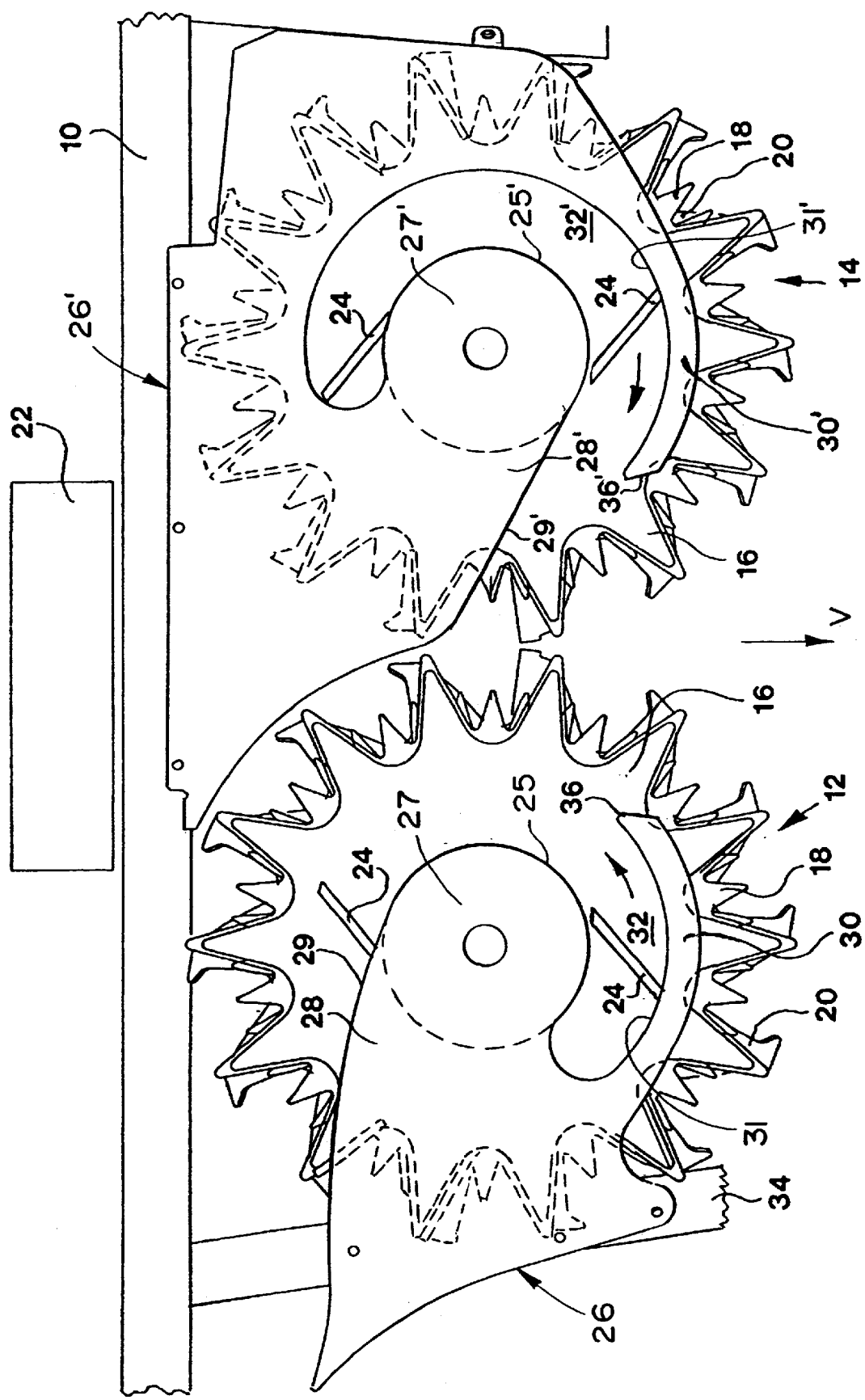

SHIELD FIXED OVER CROP CONVEYOR WHEEL OF MACHINE FOR MOWING STALK-LIKE CROPS

FIELD OF THE INVENTION

The invention pertains to a machine for mowing stalk-type crops which contains a conveyor wheel that can be put into rotation about an approximately vertical axis and which is provided with recesses distributed over its circumference and designed as receptacles for plant stalks, wherein a stationary shield that shields a region of the conveyor wheel surface is arranged above the conveyor wheel.

BACKGROUND OF THE INVENTION

A device for mowing stalk-type crops is known from U.S. Pat. No. 5,546,737. This device includes coaxially arranged cutting and conveyor wheels that rotate about an approximately vertical axis, with the conveyor wheels being above the cutting wheels and provided with a series of pocket-like recesses distributed over their circumference. The cutting wheels rotate and cut off the stalks of the plants to be harvested, for example corn stalks. The conveyor wheels that rotate in opposite directions transport the plants rearward in the pocket-like recesses. The plants are subsequently removed from the recesses by means of bow-shaped clearing devices arranged on the upper side of the conveyor wheels and transported to the feed rollers of a field chopper. In the intake region, the clearing devices are arranged at a distance from the pocket-like recesses, but extend outward to such an extent in the delivery region that they press the stalks out of the recesses. The cutting wheels are equipped with upwardly protruding ribs that serve for directing the cut plant stalks inward and holding said stalks within the effective range of the pocket-like recesses of the conveyor wheels. The conveyor wheels have a smooth upper side. Except for the clearing devices, the conveyor wheels are not provided with a shield.

Another mowing device is disclosed in GB 2 012 154 A. This mowing device is also composed of cutting wheels and conveyor wheels coaxially arranged above the cutting wheels. An upwardly open channel is defined by shields situated above, and adjacent to, the conveyor wheels. The upright plants are transported rearward through this channel and transported to the feed rollers of a field chopper. In one embodiment, the conveyor wheels are flat and provided with pocket-like recesses on the outer circumference. In another embodiment, the conveyor wheels contain prongs that are distributed over their circumference and that extend approximately in the radial direction, wherein said prongs are bent rearwardly, opposite to the direction of rotation, over approximately half their length.

A mowing device with a conveyor wheel that is provided with recesses and with a stationary shield that is arranged above the conveyor wheel is known from U.S. Pat. No. 5,852,922. In this case, it is proposed to open a depression in the shield when harvesting whole plant silage and to shield the depression when harvesting corn.

One disadvantage of the described mowing devices can be seen in the fact that plant parts accumulate on the shields of the conveyor wheels and are thus lost. If no shield is provided, corn cobs and other plant parts that drop from the plant, during the cutting process or transport, fall onto a conveyor wheel and are thrown to the ground by the rotating conveyor wheel, resulting in the crop parts being lost.

SUMMARY OF THE INVENTION

According to the present, there is provided an improved machine for mowing stalk-crops, and more particularly there is provided and improved stationary, upper shield or shield for a rotary crop conveyor that turns about an upright axis.

An object of the invention, is to provide an improved upper shield, as stated above, which is designed for reducing crop loss during harvesting.

A more specific object of the invention, is to provide an upper shield, as stated in the preceding object, which defines an opening between an outer forward region of the shield, which curves next to the roots of the gathering recesses located in the crop conveyor, and an inner region of the shield, which is mounted over a central part of the crop conveyor.

Yet another object of the invention is to provide an upper shield, as set forth in the immediately preceding object, wherein the opening is in communication with the feed path of the incoming crop material.

Still another object of the invention is to provide an upper shield for a rotary crop conveyor, where the shield is provided with a leading edge, as considered relative to the direction of rotation of the crop conveyor, to guide crop to the crop feed path.

Another object of the invention is to provide a crop conveyor having a plate-like upper conveyor section having an upper side that is provided with pocket-like recesses only in the edge region with at least one crop transport element that is designed for transporting away plant parts. In order to ensure that the transport element releases the entrained plant parts so as to re-introduce the plant parts into the crop flow, the invention proposes that the transport element have a rejecting transport behavior. For this purpose, the transport element may be arranged on the conveyor wheel at a trailing angle relative to the radial direction.

These and other objects will be evident from a reading of the ensuing description together with the appended drawings.

BRIEF DESCRIPTION OF THE DRAWINGS

The sole FIGURE is a somewhat schematic top view of a machine for mowing stalk-type crops and having stationary shields located over rotary crop conveyors and constructed in accordance with the present invention.

DESCRIPTION OF THE PREFERRED EMBODIMENT

Referring now to the drawing, there is shown a machine for mowing stalk-type crops including a main frame 10 supporting right- and left-hand mowing and conveying or gathering devices 12 and 14, respectively, as considered standing behind the machine and facing in the direction of forward movement V. The devices 12 and 14 are constructed in a conventional manner and include three disc-like conveyor wheels 16, 18, 20 that are spaced vertically, one from another and can be put into rotation about a common, approximately vertical axis by means of a drive. Each device 12 and 14 includes a cutting wheel, which is not shown in the FIGURE in order to provide a better overview, mounted beneath, and for rotation together with, the wheels 16, 18, 20. The circumference of the conveyor wheels 16, 18, 20 contains pocket-like recesses that serve for receiving plant stalks that are cut off by operation of the cutting wheels. The right-hand conveying and mowing device 12 rotates counterclockwise, while the left-hand conveying and mowing device 14 rotates clockwise, as indicated by the arrows. These conveying and mowing devices transport the cut plants rearward, opposite the forward driving direction V.

The plants are then removed from the conveyor wheels 16, 18, 20 by means of suitable clearing devices (not shown in the FIGURE) and drawn in by pre-compressing rollers 22 of a field chopper that carries the frame 10. The frame 10 may also support more than the two conveying and mowing devices 12, 14 shown. When a plurality of conveying and mowing devices are arranged side by side, the lateral transport of the plants to the pre-compressing rollers 22 conventionally takes place along the rear wall of the frame 10 or by means of a screw. The conveyor wheels 16, 18, 20 and the cutting wheels are powered by the prime mover of the field chopper that transports the machine over a field in the forward driving direction V while harvesting.

A first shield 26 is connected to the frame 10 and is arranged above the top conveyor wheel 16 of the right-hand conveying and mowing device 12. The shield 26 includes an inner shield region 27, which shields a hub of the conveyor wheel 16 and includes an almost semi-circular edge 25. The hub is supported on the inner shield region 27. In addition, the shield 26 includes an arcuate outer shield region 30 arranged above the top conveyor wheel 16 on the front side of the conveying and mowing device 12. The arcuate outer shield region 30 terminates at an end 36 situated above the side of the conveyor wheel 16 and includes an inner edge 31 disposed substantially concentric to the edge 25 of the inner shield region 27. The inner shield region 27 and the outer shield region 30 are connected by a central shield region 28. The central shield region 28 includes a leading edge 29 (relative to the direction of rotation of the conveyor wheel 16) which extends outwardly over the radial dimension of the conveyor wheel 16, approximately tangentially from the inner shield. The leading edge 29 is slightly curved opposite to the direction of rotation of the conveyor wheel 16. The inner shield region 27, the central shield region 28 and the outer shield region 30 are realized integrally in the embodiment shown; however, they may also be realized in the form of discrete elements.

The inner shield region edge 25 and the inner edge 31 of the outer shield region 30 cooperate to define an upwardly open arcuate cutout 32 between the inner shield region 27 and the outer shield region 30 (above the parts of the conveyor wheel 16 which are not shielded by the central shield 28). This cutout 32 is concentric to the arcuate edge 25 of the inner shield region 26 and is open on its end that lies downstream as viewed in the direction of rotation of the conveyor wheels 16 and closed on the upstream end. A small vertical gap in which only a few plant parts can accumulate remains between the shield 26 and the upper side of the top conveyor wheel 16. The shield regions 27, 28 and 30 are preferably curved or inclined in such a way that plant parts falling thereon are able to slide into the cutout 32.

Similarly, a shield 26 is associated with the left-hand conveying a cutting device 14, and includes an inner shield region 27', an arcuate outer shield region 30', and a central shield region 28' that cooperate to define an arcuate, upwardly open cutout 32' having a downstream end that is open in the direction of crop flow and a closed upstream end.

In the illustrated embodiment, the outer shield regions 30 and 30' of the right-hand and left-hand conveying and mowing devices 12 and 14 are not realized symmetrically because the outer shield region 30' of the left-hand conveying and mowing device 14 extends beyond the center of the feed channel, with the cutout 32' extending around the inner shield region 27' by an angle of approximately 200° while the central shield region 28 of the right conveying and mowing device 12 is smaller than the central shield region 28' and is only mounted on a brace 34 that is directed in the forward moving direction V and connected to the frame 10. The cutout 32, defined by the outer shield 30 and inner shield region 27, only surrounds the inner shield region 27 by approximately 60°. However, it would also be conceivable to realize the shields symmetrically.

Two transport elements 24 which are arranged diametrically opposite each other and are realized in the form of upwardly protruding ribs, are respectively arranged on the upper side of each top conveyor wheel 16. These transport elements 24 are arranged in trailing fashion relative to the radius of the conveyor wheels 16 by an angle of approximately 60°. Thus, the transport elements 24 have a rejecting transport behavior. The transport elements 24 extend linearly from the outer edge of a hub 26 of the conveyor wheels 16 to almost the outer edge of the conveyor wheels 16. The radial dimensions of the cutouts 32 and 32' correspond to the radial dimensions of the transport elements 24.

The feed and mowing devices 12, 14 according to the invention function in such a way that the cutting wheels cut off the plant stalks. The conveyor wheels 16, 18, 20 receive the plant stalks in the pocket-like recesses distributed over their circumference and transport the plant stalks to the feed rollers 22. If corn cobs or other plant parts fall off, they either drop directly into the cutouts 32, 32' or onto the shield regions 27–27', 28–28', 30–30', and from there they slide into the cutouts 32, 32'. The surface of each of the conveyor wheels 16 then transports the plant parts to the feed rollers 22 with the aid of the transport elements 24. The outer shield regions 30, 30' guide the plant parts in the cutouts 32, 32' and prevent them from being thrown off the conveyor wheel 16 before their re-introduction into the crop flow. Due to the rejecting transport behavior of the transport elements 24, the plant parts are thrown off the conveyor wheels 16 on the downstream ends 36, 36' of the outer shield regions 30, 30' and entrained by the flow of harvested plants. Plant parts that might remain on the conveyor wheels 16 are transported outwardly by the leading edges 29, 29' of the central shield regions 28, 28', which act as clearing devices and respectively extend from the inner shield regions 27 up to the pocket-like recesses on the edge of the conveyor wheels 16. These plant parts are then dropped into the flow of harvested plants by the conveyor wheels 16 and can be transported to the pre-compressing rollers 22 and the field chopper.

The measures according to the invention result in a machine for mowing stalk-type crops with which the crop transport can be improved. The machine can also be used for, harvesting whole plant silage or storage corn without requiring modifications.

Having described the preferred embodiment, it will become apparent that various modifications can be made without departing from the scope of the invention as defined in the accompanying claims.

What is claimed is:

1. In a machine for mowing stalk-type crops including a conveyor wheel that can be put into rotation about an approximately vertical axis and that is provided with recesses that are distributed over its circumference and designed as receptacles for plant stalks, and a stationary shield arranged above, and shielding at least a central portion of said conveyor wheel, the improvement comprising: said shield being provided with a cutout located between radially outer and inner regions of said shield, with a downstream end of said cutout, as considered relative to a working direction of rotation of said conveyor wheel, being open to said circumference of said conveyor wheel.

2. The machine according to claim 1, wherein said radially outer region of said shield, as viewed from the top, is located adjacent radially inner parts of said recesses of said conveyor wheel.

3. The machine according to claim 1, wherein said cutout is open to a lateral region of said circumference of said conveyor wheel.

4. The machine according to claim 1, wherein a crop transport element is provided at an upper surface of said conveyor wheel in a location so that it sweeps a path directly beneath said cutout so as to transport crop parts that fall into the cutout.

5. The machine according to claim 1, wherein said shield has a central region which is arranged above the conveyor wheel and only shields part of the conveyor wheel and extends further radially inward than an outer shield region; said central shield region including a leading edge, as viewed in the direction of rotation of the conveyor wheel located for causing plant parts that lie on the conveyor wheel to be pushed radially outward so as to re-introduce said plant parts into a stream of crop being conveyed by said conveyor wheel.

6. The machine according to claim 1, wherein said shield is shaped in such a way that plant parts falling thereon are able to slide onto said conveyor wheel.

\* \* \* \* \*